United States Patent [19]

LaMastro et al.

[11] Patent Number: 5,258,336
[45] Date of Patent: Nov. 2, 1993

[54] LOW EXPANSION USP TYPE I AMBER GLASS

[75] Inventors: Robert A. LaMastro, Pitman, N.J.; Dennis E. Kauser, Monroeville, Pa.

[73] Assignee: Wheaton Holding, Inc., Wilmington, Del.

[21] Appl. No.: 832,925

[22] Filed: Feb. 10, 1992

[51] Int. Cl.$^5$ ............................................. C03C 3/091
[52] U.S. Cl. .................................................... 501/66
[58] Field of Search ................................. 501/66, 68

[56] References Cited

U.S. PATENT DOCUMENTS

| | | | |
|---|---|---|---|
| 2,394,493 | 2/1946 | Schoemlaub | 501/68 |
| 3,093,598 | 6/1963 | McMillan et al. | 501/68 |
| 3,459,569 | 8/1969 | Ellis | 501/68 |
| 3,907,586 | 9/1975 | Kiefer | 501/66 |

OTHER PUBLICATIONS

Scholes; "Modern Glass Practice" 1935, Revised 1975 by Greene; pp. 305–306.
Tooley; The Handbook of Glass Manufacture 3rd Edition; vol. II pp. 778–779 and 996–997 1984.
Wheaton Non-Sol Amber Glass, Revised Jan. 3, 1990.
Schott Ruhrglas; Information Leaflet Fiolax® Clear and Amber; Jun. 1984.

*Primary Examiner*—Mark L. Bell
*Assistant Examiner*—A. Wright
*Attorney, Agent, or Firm*—Ratner & Prestia

[57] ABSTRACT

The present invention is drawn to an amber glass composition comprising, in weight percent, about:
70–79% silicon dioxide,
2.0–3.0% aluminum oxide,
3.8–4.4% sodium oxide,
0.1–1.0% potassium oxide,
13.5–14.5% boron oxide,
4.9–7.3% manganese dioxide, and
0.2–0.9% iron oxide, and having a glass colorant system selected from iron-manganese and iron-titania.

11 Claims, No Drawings

LOW EXPANSION USP TYPE I AMBER GLASS

FIELD OF THE INVENTION

The invention relates to a USP Type I, amber glass composition having a low thermal expansion coefficient.

BACKGROUND OF THE INVENTION

Certain pharmaceutical preparations require packaging in a container that provides a high degree of chemical stability and protection from ultraviolet light. Most Type I tubing vials and ampules are fabricated from a borosilicate glass, which has excellent chemical durability. Such Type I glass has a thermal expansion coefficient of $33 \times 10^{-7}$ cm/cm/°C., and is a clear glass which does not meet the USP requirement for ultraviolet light protection.

Certain currently available amber glass containers which meet both the chemical durability and ultraviolet light protection requirements are made from such amber tubing glasses, which also have thermal expansion coefficients of approximately $57 \times 10^{-7}$ cm/cm/°C. Because of the high thermal expansion coefficient of this amber tubing, vials and ampules fabricated from such tubing glasses are highly prone to cracking.

Fabrication cracks are very difficult to detect during inspection. The cracks are a problem for drug manufacturers due to breakage and loss of sterility. Such cracks are produced when temperature differences in the tubing cause high levels of stress to develop due to the high thermal expansion. Decreasing the thermal expansion would minimize the incidence of these cracks.

The colorant system used in these prior Type I amber tubing glass compositions is iron-titania. Use of the iron-manganese color system has been used in the production of Type I amber molded vials. There has been no known use of either coloring systems in low expansion based glasses.

BRIEF DESCRIPTION

The present invention comprises an amber glass composition comprising about (in percent by weight): 70–79% silicon dioxide, 2–3% aluminum oxide, 3.8 to 4.4% sodium oxide, 0.1–1% potassium oxide, 13.5–14.5% boron, 4.9–7.3% manganese dioxide, and 0.2–0.9% iron oxide. The glass colorant system of the amber glass of the current invention is selected from iron-manganese and iron-titania.

DETAILED DESCRIPTION

The base formulation of the glass composition of the current invention is an alumino-borosilicate composition with about 4% alkali and minor amounts of calcia, magnesia, zinc oxide, and baria. Thermal expansion of the glass composition of the current invention is reduced by the low alkali content of the glass. A small amount of alumina is included in the composition to prevent phase separation and devitrification of the glass during melting.

A high silica and boron content, from about 70% to 79% silicon dioxide and from about 13.5% to 14.5% boron oxide, maintains a low thermal expansion coefficient of the glass composition. Accordingly, cracking and other problems associated with currently available amber glass are overcome as a result of the low thermal expansion coefficient.

Iron-manganese is employed as the colorant system for the glass composition in the present invention. An iron-manganese system provides the best ultraviolet protection for ultraviolet light sensitive glass containers for a given concentration of colorants in the glass. These glasses also have a lower tendency to devitrify upon melting. Alternatively, iron-titania may provide the colorant for the glass composition of the claimed invention.

The sources of iron-manganese glass color system are manganese dioxide and iron oxide. The glass color of this system is largely dependent on the concentration of the sources, specifically, manganese dioxide and iron oxide, in the batch. The iron-titania glass system sources are titanium dioxide and iron oxide and the concentration of these sources also affects the resulting color of the glass end product.

Manganese dioxide, titanium dioxide and iron oxide may be provided by a number of different raw materials. Iron oxide sources may be selected from red iron oxide, melite, iron color concentrate and the like. Red iron oxide is readily available in powder form and provides iron oxide in concentration of 100% to the batch. Melite, an iron slag byproduct of foundry operations coarser in size than the red iron oxide, is also available as a reduced form of iron oxide. Iron color concentrate is a pelletized concentrated form of red iron oxide in sodium citrate comprising 35% red iron oxide. Such commercially available color concentrates, may be iron color concentrate alone or combinations of compounds. In the instant application, a color concentrate including a combination of manganese dioxide and iron oxide provides ease in handling of manganese dioxide and good composition control.

Raw materials for manganese dioxide include, but are not limited to, standard grade ores of manganese and a color concentrate form. Standard grade ores of manganese are available in fine powder form and are variable in composition. Alternative materials include a grade of manganese ore sized to $-60/+80$ US Screen sizing. Manganese color concentrate, like iron color concentrate, is a pelletized form of manganese dioxide, or a color concentrate combination of manganese dioxide and iron oxide may be used.

Rutile, a mineral source for titanium dioxide, may provide titanium dioxide for the claimed invention. In the iron-titania colorant system, the sources of iron include red iron oxide, melite, iron color concentrate (pelletized iron oxide) and the like.

The source of manganese dioxide does not have any bearing on the glass color; however, the source of iron oxide has a significant effect. Red iron oxide and the iron concentrate produce a darker amber color compared with melite. Red iron oxide is a more oxidized form of iron oxide which causes the glass to result in a darker color. When using melite, more manganese ore is added to achieve the same color. In all cases, the color may be controlled within target limits by adjusting the quality of iron and manganese in the batch.

Melting conditions may also have an effect on color. Oxidized melting conditions generally result in darker color glass which has a lower percent transmission of ultraviolet light at wavelengths of 290–450 nanometers (nm). When producing the glass under oxidized melting conditions, the amount of iron oxide added to the glass composition may be reduced to a minimum of about 0.2% iron oxide. At least 4.9% manganese dioxide is needed to meet the requirements, such as percent transmission range, of the present invention.

Table 1 below sets forth the ingredients of the glass composition of the current invention and the percent by weight of each ingredient.

TABLE 1

| INGREDIENT | PERCENT | |
|---|---|---|
| $SiO_2$ | 70.0–79.0 | (preferably 72%) |
| $Al_2O_3$ | 2.0–3.0 | (preferably 2.3%) |
| $Na_2O$ | 3.8–4.4 | (preferably 4.0%) |
| $K_2O$ | 0.1–1.0 | (preferably 0.5%) |
| $B_2O_3$ | 13.5–14.5 | (preferably 14.0%) |
| $MnO_2$ | 4.9–7.3 | (preferably 6.0%) |
| $Fe_2O_3$ | 0.2–0.9 | (preferably 0.35%) |

Minor amounts of other ingredients in the glass composition include calcia, magnesia, zinc oxide and $Cr_2O_3$, 0.0–0.04% (preferably 0%) and minor trace elements, such as barium 0.0–0.7% (preferably 0%).

The glass formulation of the present invention meets the U.S. Pharmacopeial (USP) Type I glass requirements for chemical durability and ultraviolet light protection. The USP durability range of the glass composition is from about 0.5 to about 0.8 ml of 0.02N $H_2SO_4$. Accordingly, the durability of the glass demonstrates resistance to extraction of glass constituents. This is especially important for pharmaceutical containers and glass tubing produced from the glass composition. At the same time, these glasses have lower thermal expansion coefficients, ranging from $37 \times 10^{-7}$ to $42.1 \times 10^{-7}$ cm/cm/°C. Thus, the thermal expansion is reduced by 27 to 36% over currently available amber, Type I tubing glass compositions.

In providing a measure of ultraviolet (UV) light protection, the U.S. Pharmacopeia takes into account the size of the container, but not its wall thickness. UV transmission ranges from 25% for containers less than 1 ml, in volume, to 10% for containers larger than 20 ml. With tubing vials, the larger the container volume, the thicker the sidewalls of the container. Thick containers absorb more ultraviolet light than thin walled containers. For this reason, a standard measuring condition was established to determine the percent transmission of ultraviolet light at a wavelength of 450 nm. The percent transmission of this light is then corrected for a path length of 1 mm. This measurement is abbreviated %T450.

Based on available market data pertaining to the sizes of tubing vials currently available, it was determined that an amber glass with less than 15% T450 is capable of meeting the ultraviolet light protection of any standard container fabricated from it. At least 5% manganese dioxide is required to meet the 15% T450 limit of the glass composition. The %T450 of the glass of the current invention ranges from about 4.8 to about 14.5.

The glass composition of this invention is relatively easy to melt and the softening point of the glass composition of the instant invention is from about 1442° F. to about 1530° F. The glass composition, having an iron-manganese colorant system, results in a lower tendency to devitrify upon melting.

Table 2 below sets forth the characteristics of the glass of the present invention.

TABLE 2

| Characteristic | Range |
|---|---|
| Softening Point | 1442–1530° F. |
| USP Durability | 0.5–0.8 ml of 0.02 N $H_2SO_4$ |
| Thermal Expansion | $37.1–42.1 \times 10^{-7}$ cm/cm/°C. |
| % T450 | 4.8–14.5 |

The following example illustrates the practice of the present invention but is not intended to indicate the limits of the scope thereof.

EXAMPLE

A glass composition of the present invention was produced in a production tank by combination of the ingredients listed below in Table 3. All ingredients are glass grade.

TABLE 3

| Ingredient | Amount |
|---|---|
| Sand | 910 pounds |
| Boric Acid | 228 pounds |
| Nepheline Syenite | 123 pounds |
| Manganese Dioxide | 118 pounds |
| Anhydrous Borax | 95 pounds |
| Soda Ash | 20 pounds |
| Sodium Chloride | 3.4 pounds |
| Red Iron Oxide | 2.7 pounds |

Projected target levels for manganese dioxide was 6% by weight (bw) and for iron oxide level, 0.35% bw. Fine manganese ore and red iron oxide were used as raw materials. No melting problem related to glass composition was noted.

The resulting glass composition had an amber color with a 14.5% T450, a USP powder durability of 0.5 ml of 0.02N $H_2SO_4$, a softening point of 1465° F., an anneal point of 1038° F., and a thermal expansion coefficient of $41 \times 10^{-7}$ cm/cm/°C. Tubing was manufactured from the resulting glass composition using a Danner process whereby a continuous strand of molten glass flows onto a slightly angled, slowly rotating fire clay core. At the lower end of the clay core, a hollow bulb forms from which the tubing is drawn. Air is introduced through the hollow clay core maintaining a hollow space in the glass. After being redirected horizontally, the hardening tube is transported on a roller track to the drawing machine, where it is cut.

The glass may also be manufactured by the Vello process. In the Vello process, glass from a furnace forehearth flows downward through an orifice or ring and the hollow space in the glass is maintained by a pipe with conical opening (also referred to as the bell) located within the ring. The tube, which is still soft, is redirected horizontally and is drawn off along a roller tack, cooled and cut.

The glass compositions of the present invention achieves possibilities not attained by the currently available products as exemplified by the choice of the borosilicate base, the levels of colorants needed and the selection of raw materials.

While this invention has been disclosed with reference to specific embodiments it is apparent that other embodiments and equivalent variations of this invention may be devised by those skilled in the art without departing from the true spirit and scope of this invention. The appended claims are intended to be construed to include all such embodiments and equivalent variations.

What is claimed:

1. A glass composition comprising in weight %: 70–79% silicon dioxide, 2.0–3.0% aluminum oxide, 3.8–4.4% sodium oxide, 0.1–1.0% potassium oxide, 13.5–14.5% boron oxide, 4.9–7.3% manganese dioxide, and 0.2–0.9% iron oxide.

2. A glass composition of claim 1 having a thermal expansion coefficient of from $37 \times 10^{-7}$ to $42 \times 10^{-7}$ cm/cm/°C.

3. A glass composition of claim 1 having a USP Type I durability of from about 0.5 to about 0.8 ml of 0.02N $H_2SO_4$.

4. A glass composition of claim 1 having a softening point of from about 1442° F. to about 1530° F.

5. Tubing produced by the glass composition of claim 1, said tubing having a %T450 such that said tubing meets the USP requirements for light protection.

6. A glass composition of claim 1 having an anneal point from about 1035° C. to about 1041° C.

7. A glass composition of claim 1 wherein said composition has a thermal expansion coefficient of from $37 \times 10^{-7}$ to $42 \times 10^{-7}$ cm/cm/°C., a USP Type I durability of from about 0.5 to about 0.8 ml of 0.02N $H_2SO_4$, a softening point of from about 1442° F. to about 1530° F., a %T450 of from about 4.8 to about 14.5 and an anneal point from about 1035° C. to about 1041° C.

8. A glass composition of claim 1 further including a glass colorant system selected from the group consisting of iron-manganese and iron-titania.

9. A glass composition of claim 1, wherein said glass is in tube form.

10. A glass composition of claim 9 wherein said tube is adapted to form a container, said container having a durability to resist contaminant extraction characterized by a USP Type I durability of from about 0.5 to about 0.8 ml of 0.02N $H_2SO_4$ and a thermal expansion coefficient of $37 \times 10^{-7}$ to $42 \times 10^{-7}$ cm/cm/°C.

11. A glass composition comprising in percent by weight: 72% silicon dioxide, 2.3% aluminum oxide, 4.0% sodium oxide, 0.5% potassium oxide, 14.0% boron oxide, 6.0% manganese dioxide, and 0.35% iron oxide.

* * * * *